United States Patent [19]
Levillain et al.

[11] Patent Number: 5,973,272
[45] Date of Patent: Oct. 26, 1999

[54] COMPOSITE INSULATOR WITH INSULATING TAPERED RINGS PROVIDING A TRANSITION SURFACE BETWEEN ENDPIECES AND SUPPORT INSERTED WITH THE ENDPIECES, A METHOD OF MANUFACTURING SUCH AN INSULATOR, AND APPARATUS FOR IMPLEMENTING THE METHOD

[75] Inventors: Roger Levillain, St Yorre; Gilles Bourdier, Randan, both of France

[73] Assignee: Sediver Societe Europeene d'Isolateurs en Verre et Composite, Nanterre Cedex, France

[21] Appl. No.: 08/939,413

[22] Filed: Sep. 29, 1997

Related U.S. Application Data

[63] Continuation of application No. 08/564,393, Nov. 29, 1995, abandoned.

[30] Foreign Application Priority Data

Nov. 30, 1994 [FR] France .................................. 94 14378

[51] Int. Cl.⁶ .................................................. H01B 17/06
[52] U.S. Cl. .............................. 174/179; 29/729; 29/887; 174/177
[58] Field of Search ..................... 174/176, 177, 174/178, 179, 181, 195, 196, 209; 29/887, 729

[56] References Cited

U.S. PATENT DOCUMENTS

| | | | |
|---|---|---|---|
| 4,212,696 | 7/1980 | Lusk et al. ............................... | 156/294 |
| 4,491,687 | 1/1985 | Kaczerginski et al. .................. | 174/178 |
| 4,802,731 | 2/1989 | Maschek et al. ........................ | 385/101 |
| 4,833,278 | 5/1989 | Lambeth .................................. | 174/139 |
| 5,594,827 | 1/1997 | Joulie et al. ............................. | 385/101 |

FOREIGN PATENT DOCUMENTS

| | | |
|---|---|---|
| 0121133 A3 | 3/1988 | European Pat. Off. . |
| 061356 A1 | 8/1994 | European Pat. Off. . |
| 2363170 | 4/1978 | France .................................. 174/209 |
| 504272 | 2/1975 | Japan . |

OTHER PUBLICATIONS

Physics, vol. II, Hans C. Ohanian, W. W. Norton & Company, Inc., Newyork, NY. 1985.

*Primary Examiner*—Dean A. Reichard
*Assistant Examiner*—Kamand Cuneo
*Attorney, Agent, or Firm*—Sughrue, Mion, Zinn, MacPeak & Seas, PLLC

[57] ABSTRACT

An electrical insulator includes a pair of endpieces fixed respectively to opposite ends of a cylindrical support. Extruded elastomer insulation material forms annular fins about the support. Each end of the support is inserted into a tubular housing provided in each endpiece. The fins cover a transition surface of tapering shape elastomer rings joining the outside surface of an endpiece to an outside surface of the support. A tapering ring of extruded elastomer material of triangular cross-section backs up against a shoulder of a respective endpiece at the opening to the housing into which the end of the support is inserted. The transition surface is defined by the exterior of the tapering ring.

11 Claims, 2 Drawing Sheets

COMPOSITE INSULATOR WITH INSULATING TAPERED RINGS PROVIDING A TRANSITION SURFACE BETWEEN ENDPIECES AND SUPPORT INSERTED WITH THE ENDPIECES, A METHOD OF MANUFACTURING SUCH AN INSULATOR, AND APPARATUS FOR IMPLEMENTING THE METHOD

This is a Continuation of application Ser. No. 08/564,393 filed Nov. 29, 1995, now abandoned.

The invention relates to an electrical insulator of the kind used in high tension installations to support equipment or conductors or equipment cases or feedthroughs.

BACKGROUND OF THE INVENTION

Such an electrical insulator is known from the patent U.S. Pat. No. 4,802,731. It comprises a pair of endpieces made of metal alloy, in particular an aluminum-based alloy, fixed to corresponding ends of a support that provides mechanical strength and that has an outside surface whose shape is generally that of a cylinder, a truncated cone, or some other body of revolution. The endpieces serve as anchoring elements for the insulator. The support is made of an electrically insulating composite material, e.g. a winding of organic or inorganic fibers, such as glass fiber, embedded in a settable synthetic resin, such as an epoxy resin.

The insulator also includes insulation made of elastomer material covering in part the outside surface of the support and in part the outside surface of each endpiece so as to form annular fins which serve to increase the creepage distance of the insulator. Because of their greater strength and smaller weight, insulators of the above type are progressively replacing traditional insulators made of porcelain.

Each end of the support of the insulator is inserted in a nozzle-shaped housing provided in a corresponding endpiece of the insulator, the endpiece being fixed to the support by adhesive and by an interference fit, for example. Because the endpiece is assembled in this way to the support, the outside diameter of the endpiece at the opening leading to the housing in which the end of the support is inserted is necessarily larger than the outside diameter of the support level with the opening.

It is essential to avoid trapping air inclusions between the outside surface of the support and the elastomer insulation, or between the portion of the outside surface of each endpiece and said insulation since such air inclusions give rise to incandescent electrical discharges. Air inclusions also give rise to the elastomer material insulation becoming deformed during vulcanization. Unfortunately, the elastomer insulation is generally applied to the outside surface of the support and of the endpieces by the technique of helically winding a shaped strip of elastomer material. As a result, if the difference in diameter between the endpiece and the support at the opening of the housing in the endpiece is very great, it would appear not to be possible to apply the technique of winding a shaped strip of elastomer material to build up the insulation while also avoiding any air inclusions at the opening of the housing. According to the above-mentioned document U.S. Pat. No. 4,802,731, and as can be seen in FIG. 5 of that document, a tapering transition surface is provided at each endpiece so as to obtain a progressive reduction in diameter going from the endpiece towards the support. This tapering surface thus joins the outside surface of the endpiece to the outside surface of the support. However, the tapering surface is defined by a tapering chamfer that forms part of the endpiece, with the chamfer being obtained by machining the endpiece.

The operation of machining an endpiece to obtain a tapering chamfer with adequate surface state for receiving the shaped strip constituting the installation is expensive because it must be accurate. In addition, because the chamfered end of each endpiece is angular, when the electrical insulator is in use or when it is subjected to electric shocks due to lightning, the end serves as a support for setting up electric fields that are particularly intense and this harms the insulating qualities of the insulator and increases the risk of incandescent discharges.

OBJECTS AND SUMMARY OF THE INVENTION

The object of the invention is to remedy those drawbacks.

In particular, an object of the invention is to propose an electrical insulator having very good insulation sealing in the transition zone between an endpiece and the support without any air being present in the transition zone.

Another object of the invention is to propose an electrical insulator having endpieces organized to limit the strength of the electric field which is established inside the insulator so as to slow down the aging of the materials constituting the insulator.

Another object of the invention is to provide an electrical insulator that is easy to manufacture.

These objects are achieved by an electrical insulator as defined by claim 1.

BRIEF DESCRIPTION OF THE DRAWINGS

An embodiment of the invention is described below with reference to the drawings.

MORE DETAILED DESCRIPTION

Figure 1:
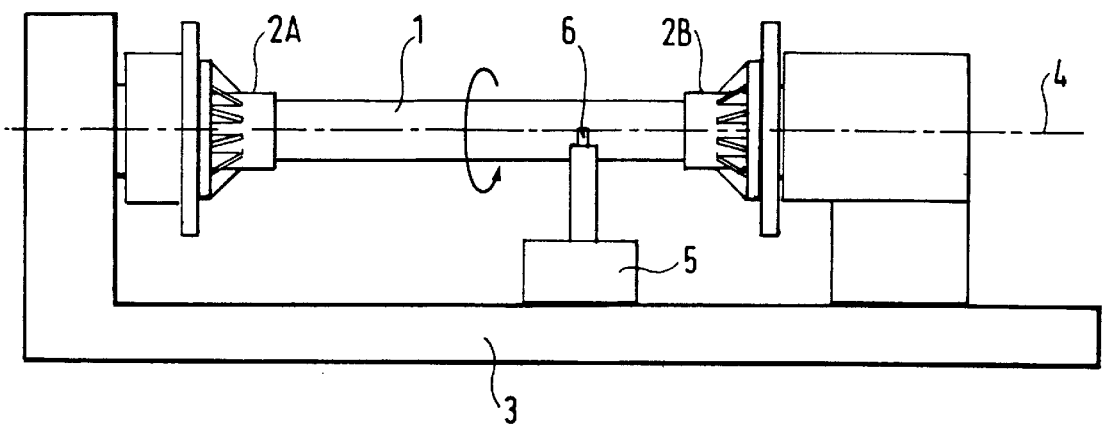
FIG. 1 is a diagram of apparatus for implementing the method of the invention.

In FIG. 1, an insert constituted by the support 1 of composite material and two endpieces 2A and 2B fixed to the ends of the support is held in the chucks of a lathe to occupy a position in which its axis is substantially horizontal. The lathe 3 also serves to rotate the insert about the longitudinal axis 4 of the support.

The lathe 3 is installed close to an extrusion bench 14 (see FIG. 5) for extruding an elastomer such as silicone, ethylene-propylene rubber, or the like. It should be observed that the lathe 3 is mounted to move along the axis 4 relative to the extrusion bench 14 so as to make it possible in a manner described below to wind a shaped strip of elastomer material helically to constitute the annular fins of the insulator. A rolling system 5 having a rotary wheel 6 is also provided, suitable for being displaced relative to the lathe 3 laterally and along the axis 4.

Figure 2:
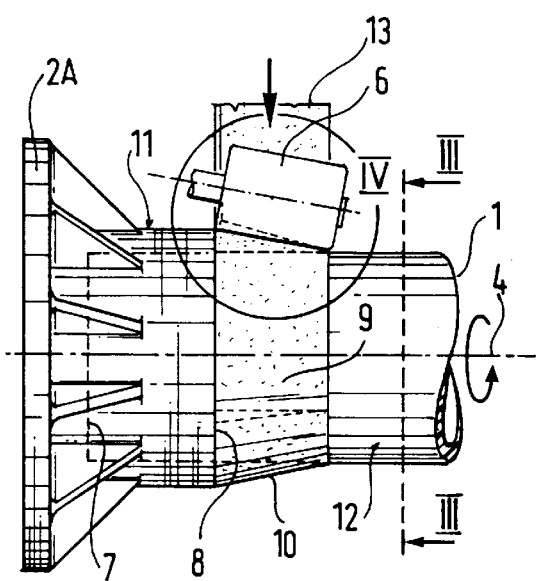
FIG. 2 shows in greater detail how the endpiece and the support are assembled together.

FIG. 2 shows how the endpiece 2A is assembled on one end of the support 1. Assembly between the endpiece 2B and the other end of the support is analogous. In this case the support 1 is cylindrical in shape. The end of the cylinder is inserted in a tubular housing 7 (shown in dashed lines) that is provided in the endpiece 2A.

Figure 4:
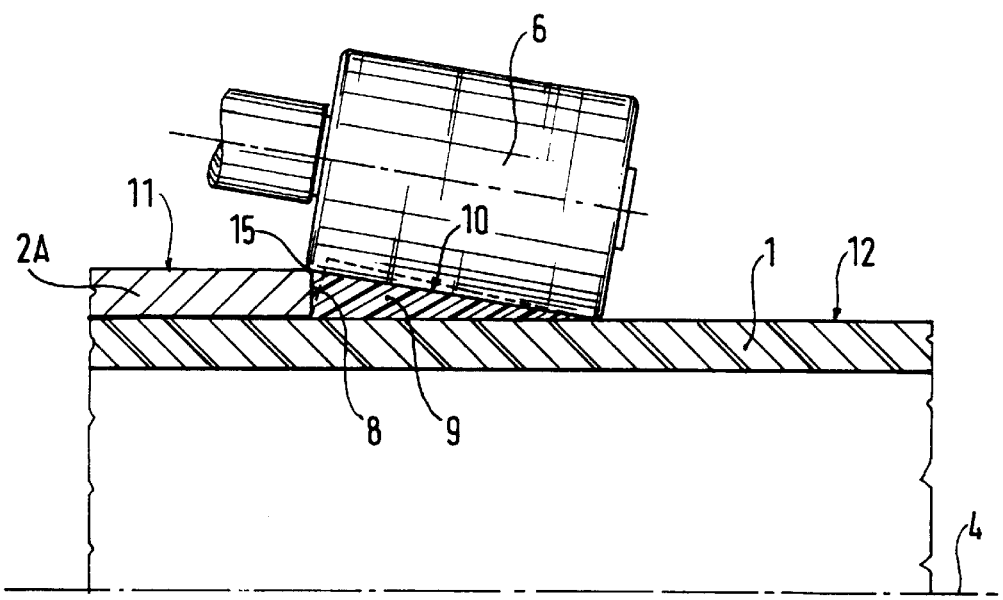
FIG. 4 shows a detail IV of FIG. 2.

According to the invention, the face of the endpiece 2A into which the end of the support is inserted has an annular shoulder 8 with rounded outer edge 15 in a longitudinal section of the insert, as can be seen in FIG. 4. The rounded edge serves to limit the strength of the electric fields that develop in the insulator at the ends of the endpieces, thereby contributing to increasing the lifetime of the insulator.

As can be seen in FIG. 2, the outside diameter of the endpiece 2A at the shoulder 8 is greater than the outside diameter of the cylindrical support at this location, and the height of the shoulder is about 1 cm to 2 cm. According to the invention, a tapering ring of elastomer material 9 is formed backing onto the shoulder 8, which ring forms an oblique tapering transition surface 10 joining the outside surface 11 of the endpiece 2A to the outside surface 12 of the support, thereby progressively reducing the diameter of the insert in the transition zone at the shoulder 8.

Figure 3:
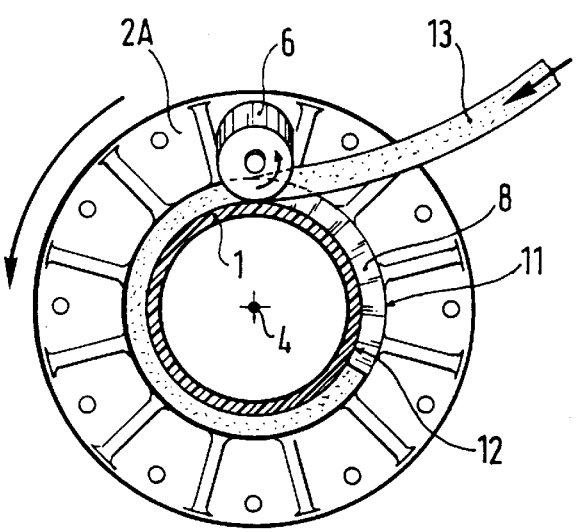
FIG. 3 is a section on line III—III of FIG. 2.

According to the invention, each tapering ring backed against a shoulder 8 of an endpiece such as 2A is made from a shaped strip of elastomer material such as 13 and as shown in FIG. 3. More particularly, according to the invention, a first die is placed on the die-carrying head of the extrusion bench 14 so as to obtain two first shaped strips 13 of elastomer material that are substantially triangular in section and of a length that is little greater than the circumference of the support 1 at each shoulder 8. Thereafter, the insert is moved relative to the rolling system 5 so that the wheel 6 mounted to rotate on an arm of the rolling system presses simultaneously against the rounded edge 15 of the shoulder of one of the two endpieces and against the support 1, as can be seen in FIG. 4. In this figure, the space between the wheel 6, the support 1, and the shoulder 8 defines the section of the ring 9 after the rolling operation, with the section of the shaped strip 13 prior to the rolling operation being shown in dashed lines.

Figure 5:
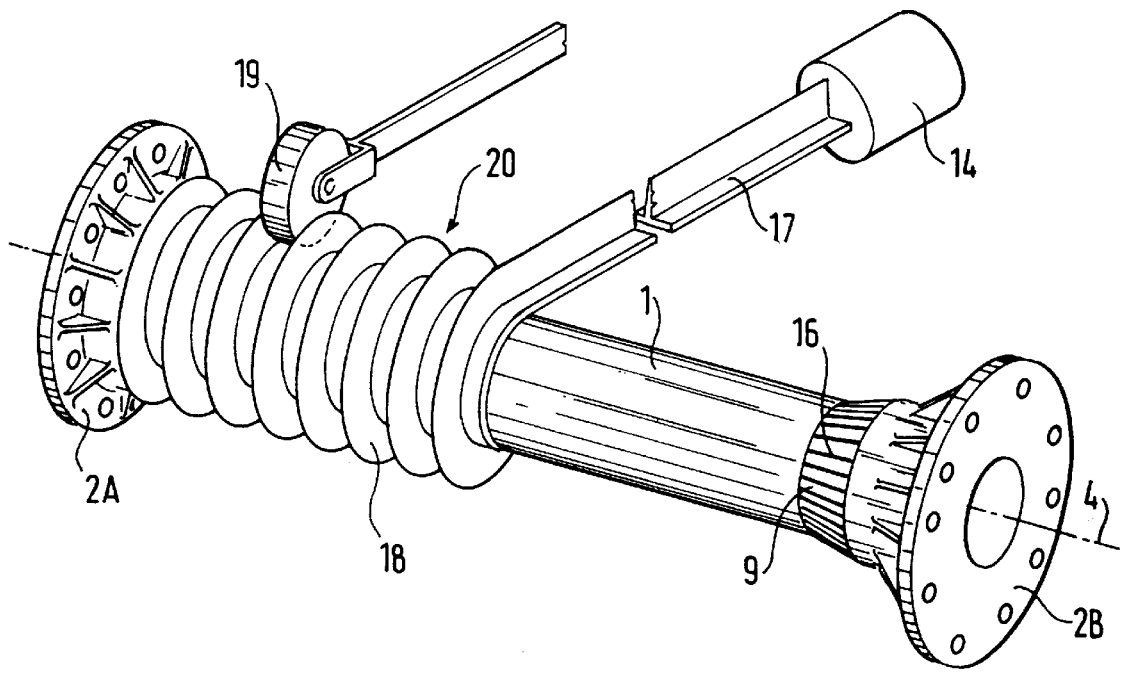
FIG. 5 shows a shaped strip of elastomer material being wound helically around the support to constitute insulation in the form of annular fins.

In FIG. 3, the insert is rotated about the axis 4 and one end of a shaped strip 13 placed flush with the endpiece 2A engages beneath the wheel 6 which presses down the strip 13 which is itself wound circularly around the support 1 being guided to press closely against the shoulder 8. Excess length of shaped strip 13 is subsequently removed by cutting the strip appropriately so as to obtain the tapering ring 9 as shown in FIG. 5 for the endpiece 2B. It should be observed that by rolling the shaped strip 13, it is possible to avoid air inclusions in the above-indicated transition zone since the elastomer material of the strip 13 completely fills the space between the wheel 6, the support 1, and the shoulder 8, as can be seen in FIG. 4.

Once the two tapering rings have been put into place on the insert, grooves 16 to a depth of about 0.5 mm are formed in the tapering outside surface 10 of each tapering ring 9, which grooves lie in planes containing the axis 4, as can be seen in FIG. 5.

The insert is then ready to receive insulation of elastomer material for increasing its creepage distance. More particularly, a second die is placed on the die-carrier head of the extrusion bench 14 so as to obtain a second shaped strip 17 as shown in FIG. 5, with the section of this strip being in the form of an upsidedown T-shape. While the insert is being rotated by the lathe 3 and moved in translation relative to the extrusion bench 14, the shaped strip 17 is wound helically so as to cover a portion of the outside surface 11 of each endpiece, the tapering surfaces 10, and the outside surface 12 of the support so as to constitute continuous annular fins such as 18 which project from the support 1, as can be seen in FIG. 5.

According to the invention, the elastomer material of the strip 17 is of the same composition as the elastomer material of the rings 9 since that simplifies manufacture of the insulator.

According to the invention, while the shaped strip 17 is being wound helically around the support, pressure is exerted with a rolling wheel 19 (generally not the same as the wheel 6) mounted on the rolling system 5 to roll between the annular fins that have already been built around the support so as to press the strip 17 properly against the support, the endpieces, and the tapering rings, so as to eliminate any inclusions of air. It should be observed that the grooves 16 provided in the outside surface of the tapering rings 9 contribute to eliminating such inclusions of air since the air can escape along the grooves. In addition, during this rolling operation, a finger (not shown) mounted on the arm supporting the wheel 19 causes each annular fin to slope at a selected angle relative to the axis 4. The slope of the annular fins improves the flow of water over the surface of the insulation, and consequently contributes to improving the electrical behavior of the insulator, e.g. when subjected to rain.

Finally, the insert coated in the elastomer material insulation 20 is subsequently placed in an oven to vulcanize the elastomer material of the insulation 20 and of the rings 9. During vulcanization, the insulator is rotated about its axis 4 so as to avoid deforming the annular fins that optionally slope relative to the axis 4.

Thus, by means of this technique for manufacturing an electrical insulator, any inclusion of air is avoided and perfect sealing of the insulator against moisture is obtained where the support is assembled to the endpieces, while nevertheless minimizing the intensity of the electrical fields that are created in the structure of the electrical insulator, thus contributing to improving its reliability, to ensuring perfect sealing, and to increasing the creepage distance and the arcing distance of the insulator.

We claim:

1. An electrical insulator for high tension installations, the insulator comprising: a cylindrical support of composite material having an outside surface and opposite ends, each of said ends being inserted axially in a portion of a respective tubular metal endpiece having an outside surface and an endface, at each of said opposite ends, a tapering extruded elastomer material ring fixed to said outside surface of said support and backed up against a respective end face of said respective endpiece, each of said rings including a tapering oblique outside transition surface joining the outside surface of the corresponding endpiece to the outside surface of the support, a unitary helically wound shaped strip of elastomer fixed to said tapering outside transition surface, and extending over portions of the outside surfaces of said corresponding endpieces and along the outside surface of the support without air inclusion between said strip and said outside surfaces of said support, said portions of said endpieces and said rings, said strip forming annular fins about said endpieces, each of said rings and said support.

2. The insulator of claim 1, in which the end face of each of said endpieces has at least a rounded outside edge flush with the tapering oblique outside transition surface of a corresponding one of said rings.

3. The insulator of claim 1, in which the rings are of the same composition as the elastomer material of the helically wound shaped strip.

4. The insulator of claim 1, wherein each of said rings consists of a wound shaped strip that is triangular in cross-section.

5. A method of manufacturing an electrical insulator for high tension installations, the insulator comprising: a cylindrical support of composite material having an outside surface and opposite ends, each of said ends being inserted axially in a portion of a respective tubular metal endpiece having an outside surface and an endface, at each of said opposite ends, a tapering extruded elastomer material ring fixed to said outside surface of said support and backed up against a respective end face of said respective endpiece, each of said rings including a tapering oblique outside transition surface joining the outside surface of the corresponding endpiece to the outside surface of the support, a unitary helically wound shaped strip of elastomer fixed to said tapering outside transition surface, and extending over portions of the outside surfaces of said corresponding endpieces and along the outside surface of the support without air inclusion between said strip and said outside surfaces of said support, said portions of said endpieces and said rings, said strip forming annular fins about said endpieces, each of said rings and said support, said method comprising: fixing each of said rings of elastomer material on the support by winding said shaped strip of elastomer material in a shape that is substantially triangular in section.

6. The method of claim 5, further comprising pressing the shaped strip of elastomer material constituting each of said rings down by means of a rolling wheel bearing against the edge of the end face of the corresponding endpiece and against the outside surface of the support.

7. The method of claim 6, further comprising rotating the support about a longitudinal axis of said support.

8. The method of claim 5, further comprising forming grooves in the tapering outside surface of the rings prior to helically winding the shaped strip of elastomer material around the support with said grooves lying in planes that contain an axis of the support.

9. The method of claim 8, wherein said pressing includes pressing against the outside surface of the endpieces, the tapering outside surface of the rings, and the outside surface of the support by passing a rolling wheel between said annular fins.

10. The method of claim 9, further comprising shaping each annular fin at a certain angle relative to the axis of the support.

11. Apparatus for manufacturing an electrical insulator for high tension installations, said insulator comprising: a cylindrical support of composite material having an outside surface and opposite ends, each of said ends being inserted axially in a portion of a respective tubular metal endpiece having an outside surface and an endface, at each of said opposite ends, a tapering extruded elastomer material ring fixed to said outside surface of said support and backed up against a respective end face of said respective endpiece, each of said rings including a tapering oblique outside transition surface joining the outside surface of the corresponding endpiece to the outside surface of the support, a unitary helically wound shaped strip of elastomer fixed to said tapering outside transition surface, and extending over portions of the outside surfaces of said corresponding endpieces and along the outside surface of the support without air inclusion between said strip and said outside surfaces of said support, said portions of said endpieces and said rings, said strip forming annular fins about said endpieces, each of said rings and said support, said method of manufacturing comprising: fixing each of said rings of elastomer material on the support by winding said shaped strip of elastomer material in a shape that is substantially triangular in section, said apparatus comprising: a tool for holding the support fitted with said endpieces in a substantially horizontal axial position and for rotating said support about a longitudinal axis, an extruder suitable for supplying said shaped strip of elastomer material substantially triangular section and supplying a further shaped strip of elastomer material of a substantially T-shaped cross-section, and a rotary wheel rolling system.

\* \* \* \* \*